United States Patent
Campbell

(10) Patent No.: US 6,684,585 B2
(45) Date of Patent: Feb. 3, 2004

(54) METHOD AND APPARATUS FOR PROVIDING A VISUAL INDICATION OF THE TENSION APPLIED TO A TENDON OF A POST-TENSION SYSTEM

(76) Inventor: Robert Campbell, P.O. Box 1587, Pearland, TX (US) 77588

( * ) Notice: Subject to any disclaimer, the term of this patent is extended or adjusted under 35 U.S.C. 154(b) by 0 days.

(21) Appl. No.: 09/867,018

(22) Filed: May 30, 2001

(65) Prior Publication Data

US 2002/0178665 A1 Dec. 5, 2002

(51) Int. Cl.$^7$ ............................. E04C 3/26; E04C 3/20
(52) U.S. Cl. ............................. 52/223.13; 52/223.14; 52/223.1; 52/223.6; 52/223.7; 405/302.2; 403/2; 403/27; 403/314; 403/300
(58) Field of Search .................... 52/223.13, 223.14, 52/223.1, 223.6, 231, 223.8, 223.7, 98; 29/452; 264/228, 229; 24/459, 122.6; 116/209; 405/302.2, 259.1, 259.4; 403/2, 41, 27, 314

(56) References Cited

U.S. PATENT DOCUMENTS

| | | | |
|---|---|---|---|
| 3,432,978 A | * 3/1969 | Erickson | 52/223.1 |
| 3,754,401 A | * 8/1973 | Lipow | 61/39 |
| 3,787,957 A | * 1/1974 | Andrews | 29/452 |
| 3,844,023 A | * 10/1974 | Surribas et al. | 29/452 |
| 3,895,879 A | * 7/1975 | Burtelson | 403/369 |
| 3,912,406 A | * 10/1975 | McGrath | 403/19 |
| 3,937,607 A | * 2/1976 | Rodormer | 425/111 |
| 4,101,227 A | * 7/1978 | Herbenar et al. | 403/27 |
| 4,640,068 A | * 2/1987 | Jungwirth et al. | 52/223.1 |
| 4,718,209 A | * 1/1988 | Hansen et al. | 52/223.1 |
| 4,802,785 A | * 2/1989 | Richards | 403/27 |
| 5,630,301 A | 5/1997 | Sieg | |
| 5,701,707 A | 12/1997 | Sorkin | |
| 5,939,003 A | * 8/1999 | Crigler et al. | 264/228 |
| 6,119,526 A | 9/2000 | Reigstad et al. | |
| 6,273,646 B1 | * 8/2001 | Shaw | 405/259.1 |

FOREIGN PATENT DOCUMENTS

| | | | | |
|---|---|---|---|---|
| FR | 1359821 | * | 3/1964 | 52/223.14 |
| GB | 1186283 | * | 4/1970 | 29/452 |
| TW | 116948 | * | 4/1994 | 52/223.13 |
| TW | 311869 | * | 11/1996 | 52/223.1 |

* cited by examiner

*Primary Examiner*—Lanna Mai
*Assistant Examiner*—Phi Dieu Tran A

(57) ABSTRACT

An anchorage for a post-tension system including an anchor body having an interior cavity and a generally flat end surface, a tendon extending through the interior cavity of the anchor body, a plurality of wedges in interference-fit relationship between a wall of the interior cavity and a surface of the tendon, a cap member positioned outwardly of the flat end surface, and a ring juxtaposed against the inner surface of the cap member. The ring is physically deformed so as to provide a visual indication of a desired amount of tension applied to the tendon. The ring is received within an annular slot formed in the flat end surface of the anchor body.

4 Claims, 3 Drawing Sheets

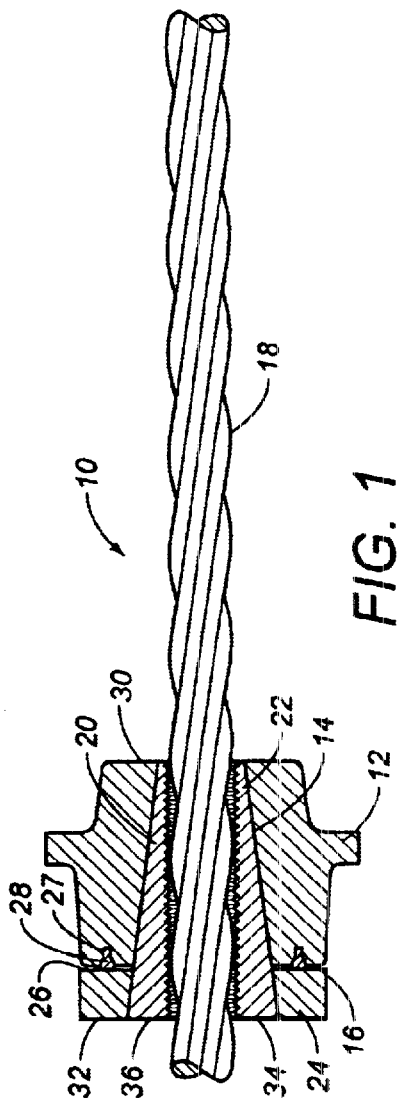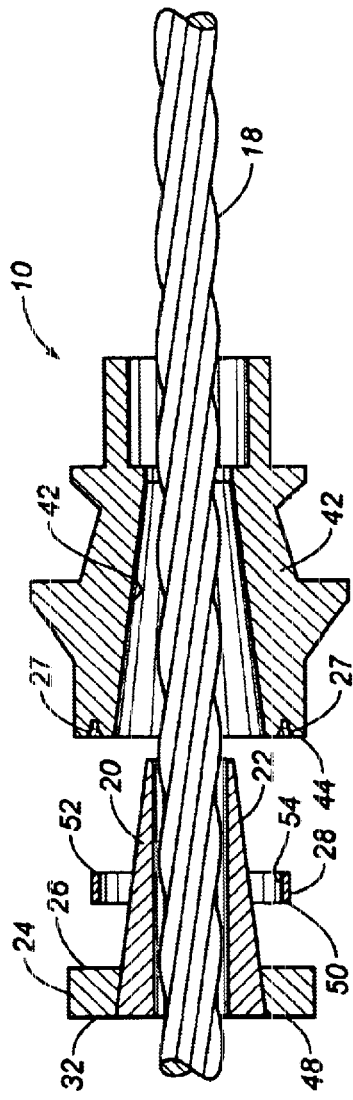

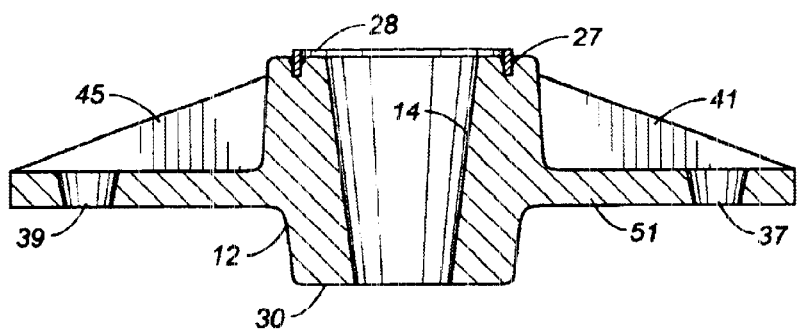
FIG. 5
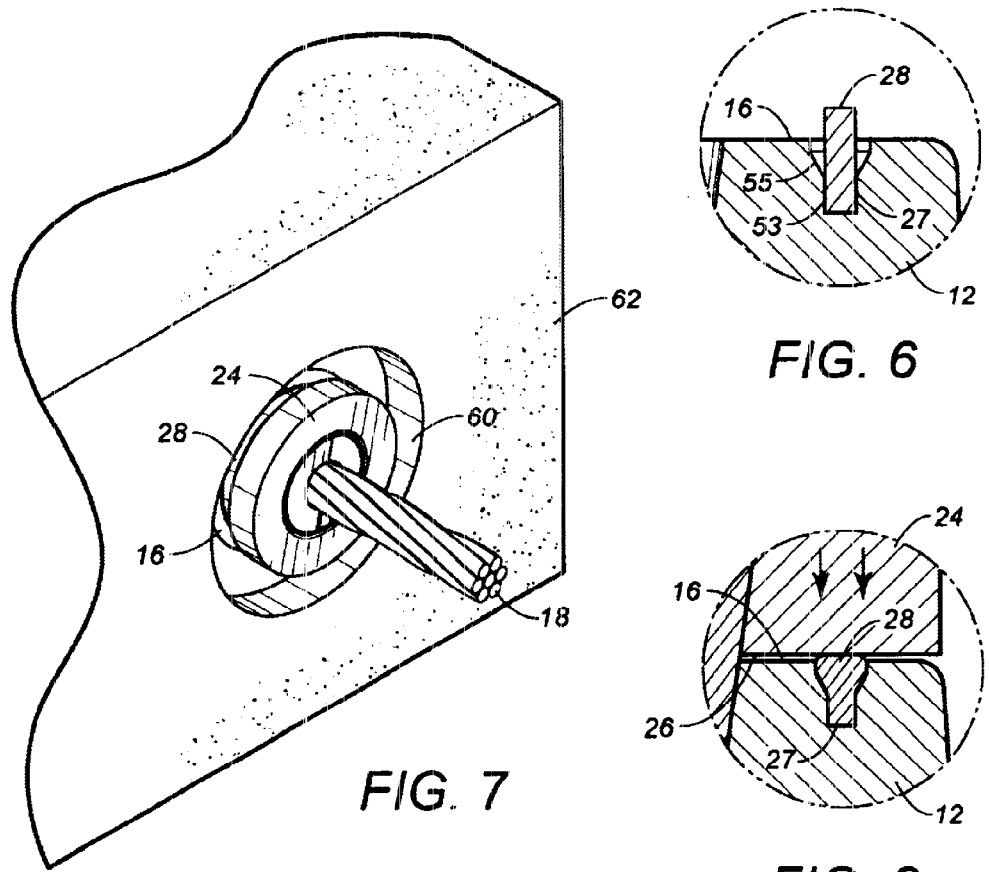
FIG. 6
FIG. 7
FIG. 8

METHOD AND APPARATUS FOR PROVIDING A VISUAL INDICATION OF THE TENSION APPLIED TO A TENDON OF A POST-TENSION SYSTEM

BACKGROUND OF THE INVENTION

1. Field of the Invention

The present invention relates generally to methods and apparatus for post-tensioning tendons within concrete structures. More particularly, the present invention relates to methods and apparatus for providing a visual indication of the tension applied to a tendon within a post-tension system.

2. Description of Related Art

Prestressed concrete is a type of reinforced concrete that has been subjected to an external compressive force prior to the application of loads. The compressive force is typically provided by steel tendons within the concrete that are initially tensioned with hydraulic jacks and held in tension by end anchors.

Prestressed concrete is categorized as either pre-tensioned or post-tensioned. Pre-tensioning refers to the method of first stressing tendons and then casting concrete around the prestressed tendons. The concrete cures before releasing the prestressed tendons and transferring the stress from the tendons to the concrete. Post-tensioning refers to the method of casting concrete around unstressed tendons and then stressing the tendons after the concrete has reached a specified strength.

Although the modern method of prestressing concrete may be traced to the late 1920's, its general use in the United States did not begin until the late 1940's or early 1950's. General acceptance and the primary increase in use occurred primarily between 1965 and 1975. Application of prestressing was being made in all aspects of construction including buildings, towers, floating terminals, ocean structures, ships, storage tanks, nuclear containment vessels, bridge piers, bridge decks, foundations, soil anchors, and virtually all other types of installations where normal reinforced concrete was unacceptable. Thus, prestressed concrete and methods for its initial installation for diverse applications is now well known.

After years of service, however, problems associated with prestressed concrete structures became apparent. These problems primarily relate to the premature deterioration of the prestressed concrete structures and the subsequent task of identifying and repairing the deteriorated structures before they experience complete loss of structural integrity.

One of the major problems associated with the failure of such prestressed concrete structures lies in the application of inadequate tensioning forces to the tendon associated with the concrete structure. Typically, at the work site, the workers will utilize the hydraulic jack so as to apply a sufficient tension to the tendon. However, when unsupervised, an inadequate tension can be applied to the tendon. In other circumstances, the tendon will remain completely unstressed. As a result, the ultimate structural integrity of the entire concrete structure can be compromised. After the concrete has set and cured, it becomes very difficult to adequately inspect as to whether the tendons have been properly tensioned.

A problem that is continually faced by the prestressing industry is the ability to provide assurance that the tendons have been properly stressed. Under certain circumstances, spray paint has been applied to the tendon to assure that a tensioning operation has actually occurred. If no tensioning has occurred, then the spray paint will not show the elongation of the tendon as a result of the tensioning. However, the application of spray paint does not provide assurance that the adequate tensioning has occurred. Under other circumstances, an instrument can be applied to the tensioned tendon in order to determine whether the tendon has been properly tensioned. However, this becomes problematic after the concrete has been actually poured and the tendon is concealed within the concrete. If a failure occurs, then it would be necessary to destructively test the concrete and the tendons in order to determine whether the tendons have been properly tensioned. At present, no method exists whereby the supervisor or inspector at the work site can easily inspect the anchors so as to determine visually whether the proper tensioning has occurred. Additionally, and at present, no method exists whereby a determination can be made of the proper tensioning subsequent to the pouring and solidification of the concrete.

In those circumstances where a failure of the concrete has occurred (e.g. a cracked slab or a building foundation), it is often difficult to determine liability or to determine the extent of the inadequate stressing without destroying the remaining concrete foundation. As such, a need developed whereby the tension of the tendon can be inspected subsequent to tensioning so as to determine the cause of the foundation failure.

It is an object of the present invention to provide a method and apparatus whereby the proper tensioning of a tendon can be determined by visual inspection.

It is another object of the present invention to provide a method and apparatus for such visual inspection which is easy to use and easy to implement.

It is still a further object and advantage of the present invention to provide a method and apparatus whereby the inspection of the proper tensioning of the tendon can be carried out without destructive techniques.

It is still a further object of the present invention to provide a method and apparatus which eliminates the need to paint or visually mark the end of the tendon.

It is still another object of the present invention to provide a method and apparatus for facilitating the visual inspection of the tensioning of tendons which is relatively inexpensive.

These and other objects and advantages of the present invention will become apparent from a reading of the attached specification and appended claims.

BRIEF SUMMARY OF THE INVENTION

The present invention is an anchorage for a post-tension system comprising an anchor body having an interior cavity and a generally flat end surface, a tendon extending through the interior cavity of the anchor body, a plurality of wedges in interference-fit relationship between a wall of the interior cavity and a surface of the tendon, a cap member positioned outwardly of the generally flat end surface, and a ring juxtaposed against the inner surface of the cap member. The ring is physically deformable so as to provide a visual indication of the desired amount of tension in the tendon.

In the present invention, the cap member has a diameter no less than the diameter of the ring. The cap has an orifice. The tendon extends through this orifice. The orifice is tapered so as to have an angle of taper matching the tapered interior cavity of the anchor body. The plurality of wedges extend through the orifice of the cap member and into the interior cavity of the anchor body. The plurality of wedges are affixed to a wall of the orifice of the cap member. The ring is received within an annular slot formed on the flat end surface of the anchor body. The annular slot is concentric with the interior cavity of the anchor body.

In the present invention, the ring has an inner diameter greater than the diameter of the interior cavity of the anchor body at the flat end surface. The ring is of a copper material. The ring is initially retained within the annular slot by a light press fit. The annular slot has a section tapering outwardly toward the flat end surface of the anchor body. The desired amount of tension is greater than 28,000 p.s.i. The physical deformation of the ring is crushing into the annular slot.

The present invention is also a method of providing a visual indication of tension applied to a tendon of a post-tension system comprising the steps of: (1) positioning an anchor onto the tendon adjacent an end of the tendon such that the end of the tendon extends outwardly for a desired distance from an end surface of the anchor; (2) placing wedges into an interior cavity of the anchor on an exterior of the tendon; (3) placing a ring around the wedges; (4) placing a cap member around the tendon so as to have an end surface facing a surface of the ring; and (5) tensioning the tendon by applying a compressive pressure against the cap member until the ring member physically deforms. The step of tensioning the tendon includes tensioning the tendon such that the compressive pressure exerted by the cap member is greater than 28,000 p.s.i. upon the ring. The tensioning of the tendon is released such that the wedges will reside in interference-fit relationship between a wall of the interior cavity of the anchor and the exterior of the tendon.

BRIEF DESCRIPTION OF THE SEVERAL VIEWS OF THE DRAWINGS

FIG. 1 is a cross-sectional view of the present invention as used in a post-tension system.

FIG. 2 shows the installation of the system in accordance with the present invention.

FIG. 5 is a cross-sectional view as taken across lines 5—5 of FIG. 4.

FIG. 6 is a detailed view showing the installation of the ring into the annular slot of the anchor body.

FIG. 7 is a perspective view showing the installation of the present invention in a slab.

FIG. 8 is a detailed view showing the deformation of the ring following installation.

DETAILED DESCRIPTION OF THE INVENTION

Figure 3:
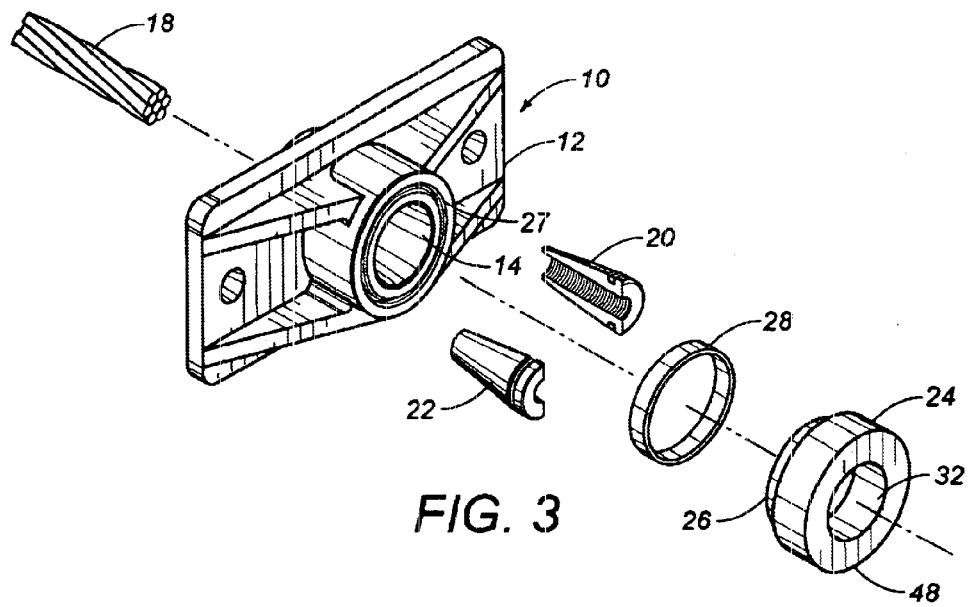
FIG. 3 is an exploded view showing the components of the present invention.

Referring to FIG. 1, there is shown at 10 the anchorage for a post-tension system in accordance with the teachings of the present invention. The anchorage 10 includes an anchor body 12 having an interior cavity 14 and a generally flat end surface 16. A tendon 18 extends through the interior cavity 14 of the anchor body 12. A plurality of wedges 20 and 22 reside in interference-fit relationship between the wall of the interior cavity 14 and an exterior surface of the tendon 18. A cap member 24 is positioned outwardly of the generally flat end surface 16 of the anchor body 12. The cap member 24 has an inner surface 26 which faces the flat end surface 16 of the anchor body 12. A ring 28 is shown as crushed within an annular slot 27 formed inwardly of the flat end surface 16. As can be seen in FIG. 1, the ring 28 is physically deformed so as to provide an indication of the desired amount of tension applied to the tendon 18. This physical deformation results in the close juxtaposition of the inner surface 26 of the cap member 24 against the flat end surface 16 of the anchor body 12.

The anchor body 12 is a conventional steel anchor used in construction. The conventional steel anchor 12 has a tapered interior cavity 14 extending from the flat end surface 16 to the opposite end surface 30 of the anchor body 12. The wedges 20 and 22 have an exterior surface with an angle of taper matching the angle of taper of the tapered wall of the interior cavity 14 of the anchor body 12. As such, as the tension in the tendon 18 is released, the retracting movement of the tendon 18 will force the wedges 20 deeper into the cavity 14 so as to establish a more secure interference-fit relationship between the exterior of the tendon 18 and the wall of the interior cavity 14 of the anchor body 12.

As can be seen in the present invention, the cap member 24 also has an orifice 32. The orifice 32 is suitably tapered so as to match the angle of taper of the interior cavity 14. The wedges 20 and 22 have a suitable length so as to extend through the tapered orifice 32 of the cap member 24 and into the tapered cavity 14 of the anchor body 12. When installed, the end surfaces 34 and 36 of the wedges 22 and 20, respectively, will be flush with the end surface of the cap member 24.

Within the concept of the present invention, it is important to note that the wedges 20 and 22 can be permanently affixed within the tapered orifice 32 of the cap member 24. The wedges 20 and 22 can be formed with the cap member 24 or can be epoxied in place. Alternatively, and furthermore, the cap member 24 could have an abutment surface on the inner surface 26 which could be used to both urge the wedges 20 and 22 into the cavity 14 and also to physically deform the ring 28.

During the application of tension to the tendon 18, a hydraulic jack will engage the end 38 of the tendon 18. A physical force will be applied such that a compressive pressure is applied to the cap member 24 and to the wedges 20 and 22. Simultaneously, a tensioning force is applied to the tendon 18. When the compressive force applied to the outer surface of the cap member 24 is greater than a desired amount, the ring 28 will physically deform because of the compressive force applied by the inner surface of the cap member 24. As a result of this process, a suitable inspector can easily visually identify the result of the deformation of the ring 16 for the purposes of determining whether a desired amount of tension has been applied to the tendon 18. Importantly, in the present invention, the ring 28 will not deform until the desired amount of pressure has been applied. As such, it is not necessary for an inspector to determine the amount of physical deformation of the ring 28. In the preferred embodiment of the present invention, the ring will be crashed into the annular slot such that the inner surface 26 of the cap member 24 will be closely juxtaposed against the flat end surface 16 of the anchor body 12.

FIG. 2 shows the anchorage system 10 of FIG. 1 as associated with a different type of anchor body 42. There are a wide variety of anchor bodies, such as anchor body 12 or anchor body 42, in use at present. It is believed that the present invention is adaptable and usable with a wide variety of different types of anchor bodies. Anchor body 42 also has a flat end surface 44 and a tapered interior cavity 46. The annular slot 27 is formed inwardly of the flat end surface 44 so as to be concentric with the cavity 46.

In FIG. 2, it can be seen that the cap member 24 has the wedges 20 and 22 affixed within the tapered orifice 32 at the end surface 48 of the cap member 24. As the cap member 24 has compressive forces applied to the end surface 48, the wedges 20 and 22 will move further and deeper into the tapered interior cavity 46 of the anchor body 42. Similarly, the inner surface 26 of the cap member 24 will exert compressive forces onto the surface 50 of the ring member 28. The ring 28 has an inner diameter 54 suitable for extending around the exterior of the wedges 20 and 22. The inner diameter 54 should be no greater than the diameter of the cap member 24.

FIG. 3 shows the exploded arrangement of the anchorage system 10 of the present invention. As can be seen, the anchor body 12 has an interior cavity 14. The wedges 20 and 22 are illustrated as separated from the cap member 24. As stated previously, it is possible, within the concept of the present invention, that the wedges 20 and 22 can be separated from the cap member 24 and that a shoulder of the cap member 24 can be used so as to urge the wedges 20 and 22 into their desired position within the tapered cavity 14 of the anchor body 12. The cap member 24 has tapered orifice 32 formed therein. The ring 28 has a diameter that is suitable for being positioned by a light press fit into the annular slot 27 formed at the flat end surface of the cap member 24. A shoulder area can be formed on the end surface 26 so as to assure a proper alignment of the ring member 28 with the end surface 26. The tendon 18 will extend through the interior cavity 14, be retained by the wedges 20 and 22, and extend outwardly of the end surface 48 of the cap member 24.

As was stated earlier, the ring 28 of the present invention has a very specialized configuration. Because of the large amount of pressures applied to the ring 28, it is very important to configure the ring 28 so as to physically deform when the pressure is applied above a desired level. In the present invention, for the formation of building foundations, it is important that the tendon 18 be tensioned to greater than 28,000 p.s.i. As such, the ring 28 should be suitably configured so that the physical deformation will occur at or above 28,000 p.s.i. In order to configure the ring 28 so as to have these very specialized configurations, a great deal of experimentation has occurred. The ring 28 is formed of a copper material so that the ring will not corrode when placed into the structural environment of the concrete slab. Also, copper was found to have the suitable characteristics for the purposes of displaying an immediate physical deformation when the desired amount of pressure exceeded a certain level.

Figure 4:
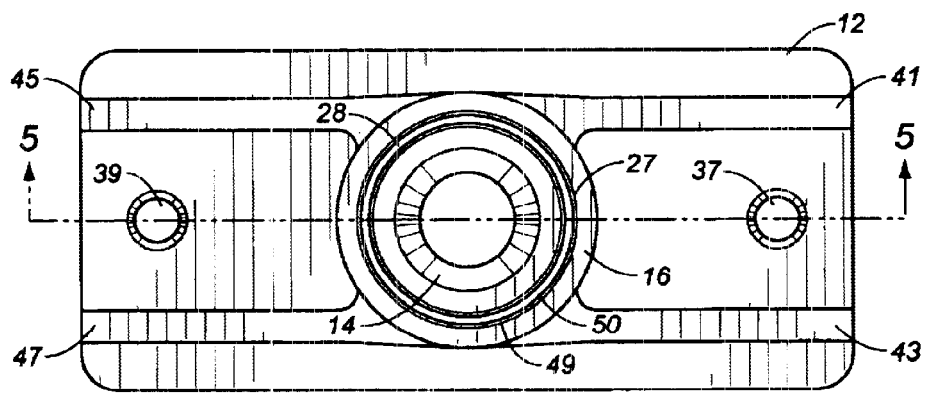
FIG. 4 is an end view of the anchor body as used in the present invention.

FIG. 4 is an end view showing the anchor body 12 as used in the present invention. The anchor body 12 is a conventional anchor that is used for prestressing construction activities. In particular, the anchor body 12 is formed of a steel material and has a tapered interior cavity 14 extending from a flat end surface 16 to the opposite end of the anchor body 12. Nail holes 37 and 39 are formed through the anchor body 12 so as to facilitate the placement of the anchor body 12 onto a form board. Suitable gussets 41, 43, 45 and 47 extend toward the flat end surface 16 across the anchor body 12 so as to enhance the physical strength of the anchor body 12.

Importantly, in FIG. 4, it can be seen that the annular slot 27 is formed around the interior cavity 14 on the flat end surface 16. The annular slot 27 is concentric with the interior cavity 14. The ring member 28 is illustrated as received within the annular slot 27. The end surface 50 of the annular ring 28 will be in a position so as to face the inner surface 26 of the cap member 24. A small space 49 is illustrated between the outer wall of the ring 28 and the inner wall of the annular slot 27. This annular space 49 allows the ring 28 to suitably deform and flow upon the application of proper pressures.

In FIG. 5, it can be seen that the anchor body 12 has the tapered interior cavity 14 extending from end 30 of the anchor body 12 to the flat end surface 16 of the anchor body 12. The annular slot 27 is formed in the flat end surface 16. The annular ring 28 is illustrated as positioned within the annular slot 27. In FIG. 5, it can be seen that the ring 28 has a portion that extends outwardly beyond the flat end surface 16 of the anchor body 12. In normal practice, if an inspector sees that the ring 28 extends outwardly from the flat end surface 16 or the inner surface 26 of the cap member 24 is not juxtaposed against the flat end surface 16 of the anchor body 12, then an improper amount of tension has been applied to the tendon.

FIG. 5 further shows that the nail holes 37 and 39 as formed in the planar portion 51 of the anchor body 12. Gussets 41 and 45 are shown as extending angularly upwardly across the planar portion 51 of the anchor body 12.

FIG. 6 shows a detailed view of how the ring 28 is received within the annular slot 27. In the present invention, the annular slot 27 has a first portion 53 which has a width generally matching the thickness of the ring 28. As such, the ring 28 can be installed within the slot 27 through a light press fit. The slot has an outwardly tapering portion 55 extending toward the flat end surface 16 of the anchor body 12. As such, the annular slot 27 provides a "well" suitable for receiving the flow of the deformed ring 28 after the application of proper pressures. The volume of the annular slot 27 should be generally equal to the volume of the ring 28.

FIG. 7 shows how the visual inspection of the installation can occur through the use of the present invention. In FIG. 7, it can be seen that the tendon 18 extends outwardly of a pocket 60 formed in a slab 62. The pocket 60 is typically formed by a conventional pocketformer apparatus. In normal use, after the tendon 18 has been properly tensioned, the pocket 60 will be filled with a grout material. In the present invention, the inspector can simply look into the pocket 60 so as to examine the cap member 24 and the result of the physically deformation of the ring 28. If the ring 28 is not physically deformed (i.e. the inner surface of the cap member 24 is not juxtaposed against the flat end surface 16 of the anchor body 12), then the inspector will know that the tendon 18 has not been properly tensioned or that an inadequate amount of tension has been applied to the tendon 18. As a result, the problem associated with inadequate tensioning can be corrected prior to sealing the pocket 60 and prior to cutting the outwardly extending end of the tendon 18.

On the other hand, if the ring 28 is deformed (i.e. the inner surface of the cap member 24 is juxtaposed against the flat end surface of the anchor body), then the inspector will know that a proper tension has been applied to the tendon 18. The outwardly extending end of the tendon 18 can be cut off and the pocket 60 sealed with grout. In the event that the slab 62 should become cracked and it is necessary for an inspector to examine the slab to determine liability, the grout which is used to seal the pocket 60 can simply be removed so that the inspector can look at the ring 28 to determine if the tendon 18 was properly tensioned prior to job completion. It is not necessary to damage or destroy the slab 62 in order to determine whether the tendon 18 has been tensioned.

FIG. 8 is a greatly enlarged view showing the arrangement between the cap member 24, the deformed ring 28 and the flat end surface 16 of the anchor body 12. The pressure is applied to the end surface of the cap member 24 (as shown by the arrows). The pressure between the inner surface 26 of the cap member 24 and the flat surface 16 of the anchor body 12 will cause the ring 28 to deform into the annular slot 27. In other words, the wall surfaces of the ring 28 will be crushed and will flow into the "well" of the annular slot 27. When the tension is removed from the cap member 24, the ring 28 will not return to its original configuration but will be retained in its tension-indicating configuration.

The foregoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. An anchorage for a post-tension system comprising:

an anchor body having an interior cavity and a generally flat end surface, said interior cavity being tapered;

a tendon extending through said interior cavity of said anchor body;

a plurality of wedges in interference-fit relationship between a wall of said interior cavity and a surface of said tendon;

a cap member positioned outwardly of said generally flat end surface, said cap member having an inner surface, said cap member having a tapered orifice, said tendon extending through said orifice, an angle of taper of said orifice matching an angle of taper of said interior cavity, said plurality of wedges extending through said orifice and said interior cavity, said plurality of wedges having an end affixed to said cap member; and a ring having an annular edge juxtaposed against said inner surface of said cap member, said ring member having an opposite annular edge contacting said end surface of said anchor body, said ring having a physical deformation which visually indicates a desired amount of tension in said tendon, said ring member positioned so as to be axially aligned with said interior cavity of said anchor body, said anchor body having an annular slot formed in said flat end surface, said ring having said opposite annular edge received within said annular slot, said annular slot having a first portion having a width generally matching a thickness of said ring, said annular slot having a second portion with a width greater than said thickness of said ring.

2. The anchorage of claim 1, said cap member having a diameter no less than a diameter of said ring.

3. The anchorage of claim 1, said plurality of wedges being affixed to a wall of said orifice of said cap member.

4. The anchorage of claim 1, said second portion opening to said flat end surface, said ring being press fit into said first portion.

* * * * *